Nov. 17, 1942.　　　L. O. CARLSEN　　　2,302,004
GEAR CUTTING MACHINE
Filed Nov. 24, 1939　　　8 Sheets-Sheet 1

Inventor
LEONARD O. CARLSEN

By
B. E. Schlesinger
Attorney

Nov. 17, 1942.   L. O. CARLSEN   2,302,004
GEAR CUTTING MACHINE
Filed Nov. 24, 1939   8 Sheets-Sheet 2

Inventor
LEONARD O. CARLSEN
By
Attorney

Inventor
LEONARD O. CARLSEN

Nov. 17, 1942.  L. O. CARLSEN  2,302,004
GEAR CUTTING MACHINE
Filed Nov. 24, 1939  8 Sheets-Sheet 5

Inventor
LEONARD O. CARLSEN
By
Attorney

Nov. 17, 1942.   L. O. CARLSEN   2,302,004
GEAR CUTTING MACHINE
Filed Nov. 24, 1939   8 Sheets-Sheet 7

Inventor
LEONARD O. CARLSEN
By
B. Schlesinger
Attorney

Patented Nov. 17, 1942

2,302,004

UNITED STATES PATENT OFFICE 2,302,004

GEAR CUTTING MACHINE

Leonard O. Carlsen, Rochester, N. Y., assignor to Gleason Works, Rochester, N. Y., a corporation of New York Application November 24, 1939, Serial No. 305,876

14 Claims. (Cl. 90—5)

The present invention relates to machines for producing gears and particularly to machines for generating longitudinally curved tooth gears such as spiral bevel and hypoid gears with a face-mill type of gear cutter.

In machines for generating hypoid gears employing face-mill cutters, it has heretofore been considered necessary to provide two angular adjustments for the cutter. These adjustments together have given general control of the tooth bearing and of the pressure angle of the gear to be cut and have enabled the cutter, moreover, to be positioned so that it may represent either a basic crown gear or the mate of the gear to be generated. These adjustments have been found advantageous, also, on machines for generating spiral bevel gears since they have enabled a single face-mill gear cutter to be employed to cut gears of a wide range of different pressure angles. With the introduction of "Formate" (non-generated) gears into the spiral bevel gear field, one of these adjustments has been employed, also, as in the hypoid field, to position the cutter to represent the mate of the pinion being generated.

A primary object of the present invention is to provide a spiral bevel and hypoid gear generating machine in which the angular adjustments of the cutter are eliminated but which has substantially the same range of usefulness as machines provided with the two angular adjustments. To this end, it is an object of the invention to provide a spiral bevel and hypoid gear generating machine in which modification of the ratio of roll between the tool and work during generation is employed, instead of angular adjustment of the cutter, to control tooth bearing, pressure angle, type of generation, etc. The angular adjustments of the cutter heretofore deemed necessary are omitted and thereby a simpler, more compact and more rigid machine than previous types of spiral bevel and hypoid gear generators, is provided. Yet this machine will produce gearing capable of transmitting uniform motion and has a capacity equal to that of spiral bevel and hypoid machines heretofore built.

A further object of this invention is to provide a mechanism, which will be simple in construction but substantially universal in range, for controlling the modification of the ratio of roll.

Another object of the invention is to provide in a machine of the character described, a drive for the cutter which will be extremely quiet and smooth.

The invention relates further to that type of machine for generating tapered gears in which the cutter is secured to a spindle that is eccentrically mounted in a carrier which, in turn, is eccentrically journaled in the cradle. Another object of the invention is to provide an improved drive for the cutter on this type of machine.

A still further object of this invention is to provide a machine of the type described in which adjustment of the cutter to compensate for wear is eliminated and in which, instead, the work may be adjusted, after sharpening of the cutter, to compensate for the reduced heights of the cutter blades. With this construction, the cutter spindle may be mounted directly in the cutter carrier, and the intermediate sleeve heretofore required may be eliminated. Thus, a more rigid accurate mounting of the cutter spindle itself may be obtained.

Other objects of the invention will be apparent hereinafter from the specification and from the recital of the appended claims.

Figure 1:
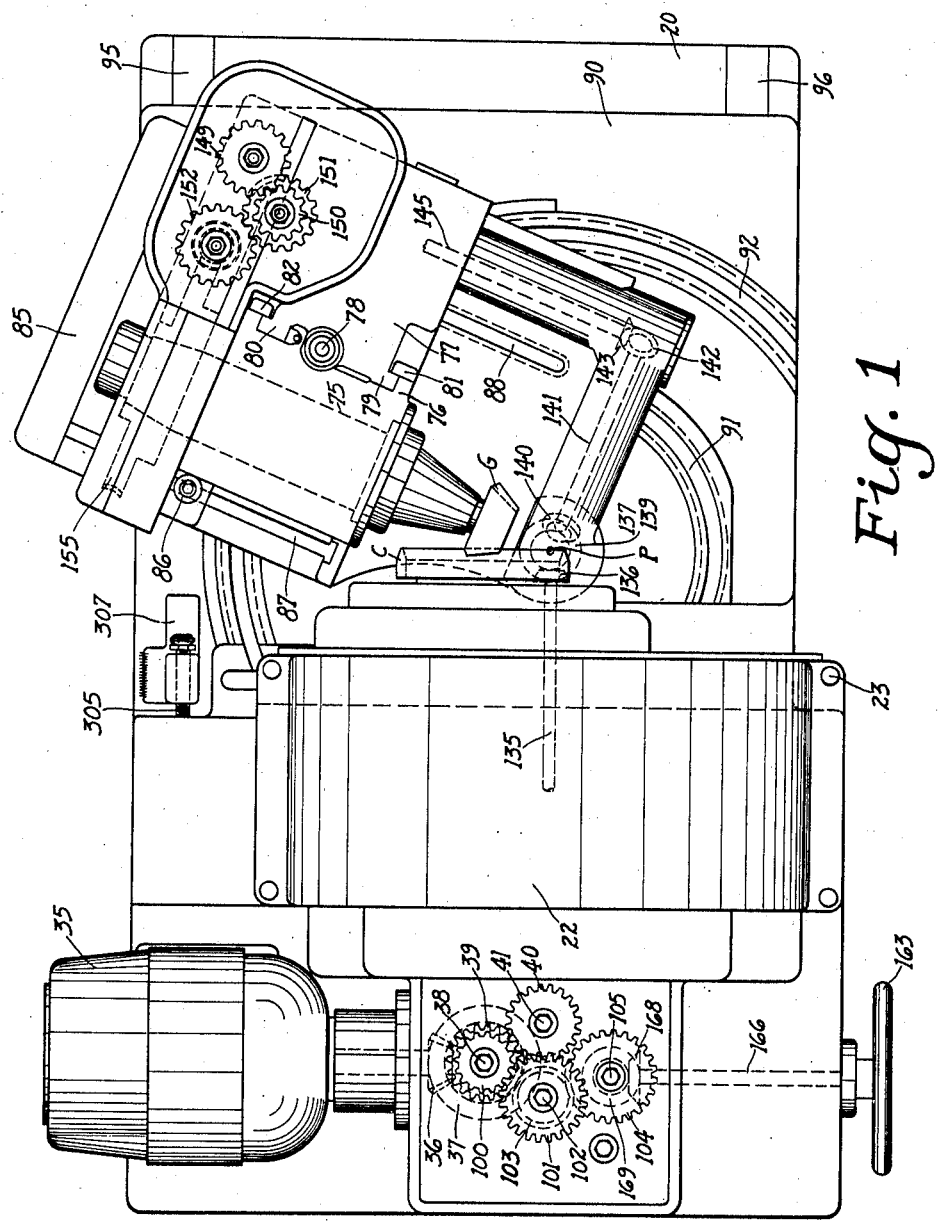
Fig. 1 is the plan view of a combined spiral bevel and hypoid gear generator built according to one embodiment of this invention.

The machine illustrated in the drawings is of the intermittent indexing type. In its operation, the work is fed into operative relation with the cutter, then the work and cutter are rolled relative to one another to generate a tooth surface or a pair of tooth surfaces of the gear, then the work is withdrawn from operative relation with the cutter, and the work is indexed. Then the work is fed back into the cutter, beginning the cycle anew.

In the machine illustrated, the generating roll is produced by oscillation of a cradle on which the cutter is mounted and by simultaneous rotation of the work spindle on which the gear blank, that is to be cut, is secured. The feed and withdrawal movements are produced by reciprocation of a sliding base on which the work spindle is mounted. The work spindle is journaled in a head that is adjustable on the sliding base to position the work in accordance with the pitch cone angle, pitch cone distance, and offset of the gear or pinion to be cut. The sliding base reciprocates in the direction of the axis of cradle and is adjustable in the direction of that axis.

As already indicated, the cutter, which is of the face-mill type, is secured to a spindle that is journaled eccentrically in a carrier which, in turn, is eccentrically mounted in the cradle and is rotatably adjustable therein. The cutter spindle itself extends in a direction parallel to the axis of the cradle. Rotary adjustment of the carrier in the cradle varies the radial position of the cutter from the axis of the cradle and rotary adjustment of the cradle on the base of the machine enables the position of the cutter to be varied angularly about the axis of the cradle. Thus the cutter may be positioned to cut gears of any desired spiral angle.

The described mounting and adjustment of the cutter is not, in itself, broadly new. With the present invention, however, an improved drive to the cutter spindle is provided. The improved drive includes a pair of shafts, one of which is journaled in the frame of the machine coaxial of the cradle, and the other of which is journaled in the cutter carrier coaxially thereof. The first shaft is driven from the main drive motor of the machine through suitable gearing including speed change gears. The second shaft is driven from the first through a pair of cylindrical gears, spurs or helicals. The second shaft drives a third shaft, which is journaled in the carrier at right angles to the second shaft, through a pair of spiral bevel gears and this third shaft drives the cutter through a second pair of spiral bevel gears. The spiral bevel gears make for a very quiet, smooth drive. The use of shafts that are mounted coaxially of the cradle and of the carrier, respectively, permit of securing the desired adjustments of the cutter without the use of telescoping shafts and they make the machine compact and accurate. The second and third shafts are mounted in the carrier, thereby enabling the number of gears required in the drive to be kept at a minimum.

The cutter spindle is journaled directly in the carrier without any intermediate sleeve such as has heretofore been employed. Adjustment of the sliding base, on which the work is mounted, allows of compensating for reduction in the height of the blades of the cutter after sharpening. The only adjustment which a cutter has, then, is that provided by rotation of the carrier and rotation of the cradle itself. Hence, the cutter has a much more rigid mounting than in any hypoid gear cutting machine heretofore built.

The control over tooth bearing, pressure angle, etc., which has heretofore been obtained by angular adjustment of the cutter is, as already indicated, secured in the present machine by modifying the roll of the cradle during generation of the tooth profiles. The cradle is driven as usual through a worm and a worm wheel but, in addition, means is provided for moving the worm axially at a varying rate during its rotation. Thus, an additional motion is imparted to the cradle at a varying velocity to vary the rate of the cradle movement and thereby to vary the ratio of roll of cradle and work during generation.

For reciprocating the cradle worm, a cam might be employed. The cam would have to be changed, however, for every different job. A cradle worm reciprocating mechanism that is universal in its range is provided, instead, on the present machine. This mechanism is in the form of an eccentric comprising a rotary plate and a roller which is adjustably mounted on the plate for radial adjustment thereon. The plate itself is rotatably adjustable, also, so that the position of the roller about the axis of the plate may be varied.

The roller is operatively connected to the cradle worm to reciprocate the cradle worm as the eccentric is rotated. Suitable gearing is arranged to drive the plate in time with the rotation of the cradle worm and from the cradle worm so that the eccentric is reversed with reversal of the cradle worm at the ends of the generating and return rolls of the machine.

A spring might be employed to hold the roller in operative relation with the cradle worm, but a spring has a limited effectiveness and would not be satisfactory for the extended axial movement of the cradle worm that may be required in cutting gears on the present machine. For this reason hydraulic pressure is preferably employed for this purpose. To this end, the cradle worm is connected to one end of a piston that is adapted to contact at its other end with the roller. During operation of the machine, hydraulic pressure is applied in one direction to hold the piston against the roller, thereby causing the cradle worm to move axially as the plate carrying the roller oscillates.

Reference will now be had to the drawings for a more detailed description of the machine.

Figure 2:
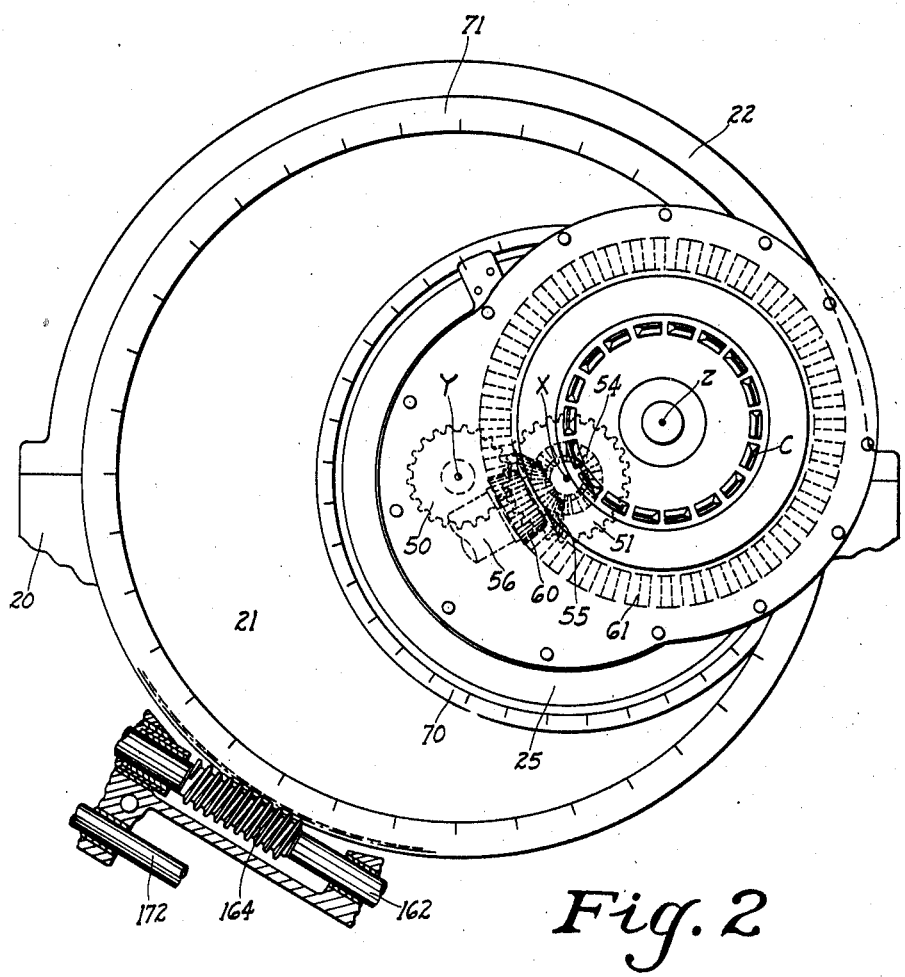
Fig. 2 is a fragmentary elevational view looking at the front end of the cradle of the machine.
Figure 3:
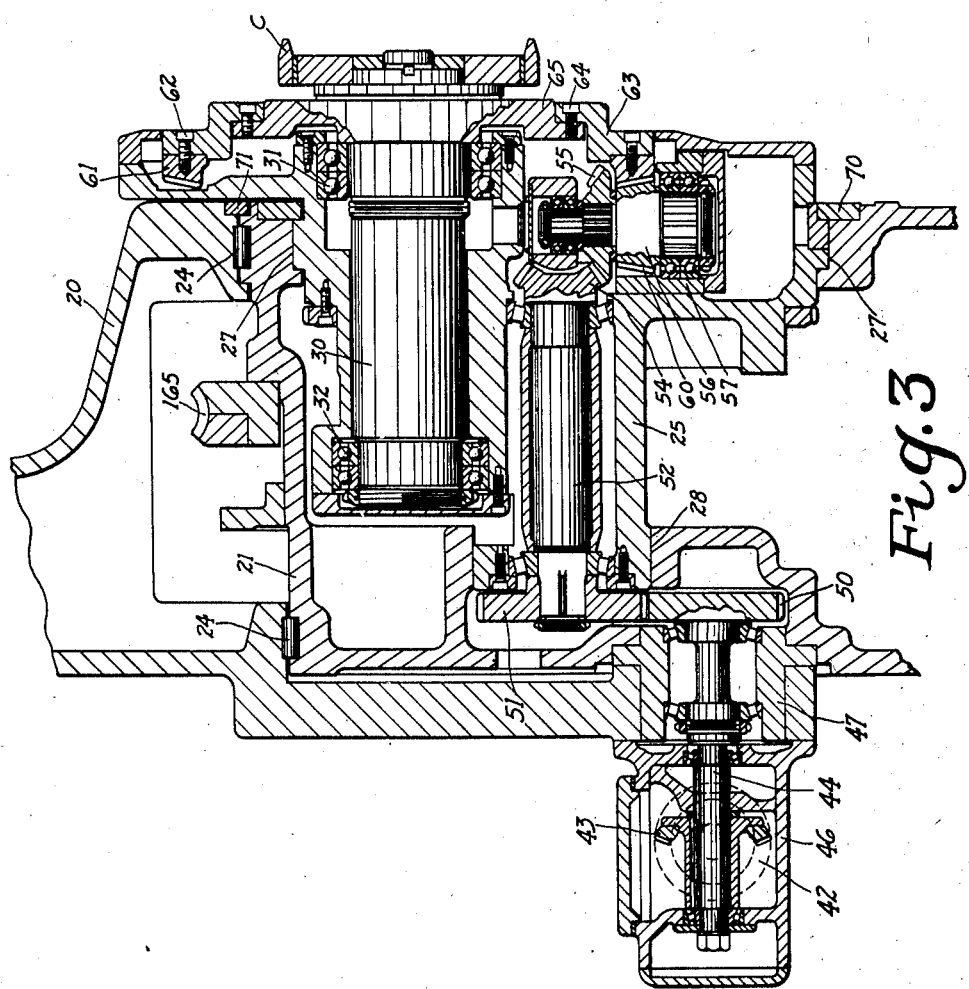
Fig. 3 is a fragmentary horizontal sectional view through the cradle showing, in particular, details of the cutter mounting and of the cutter drive.
Figure 4:
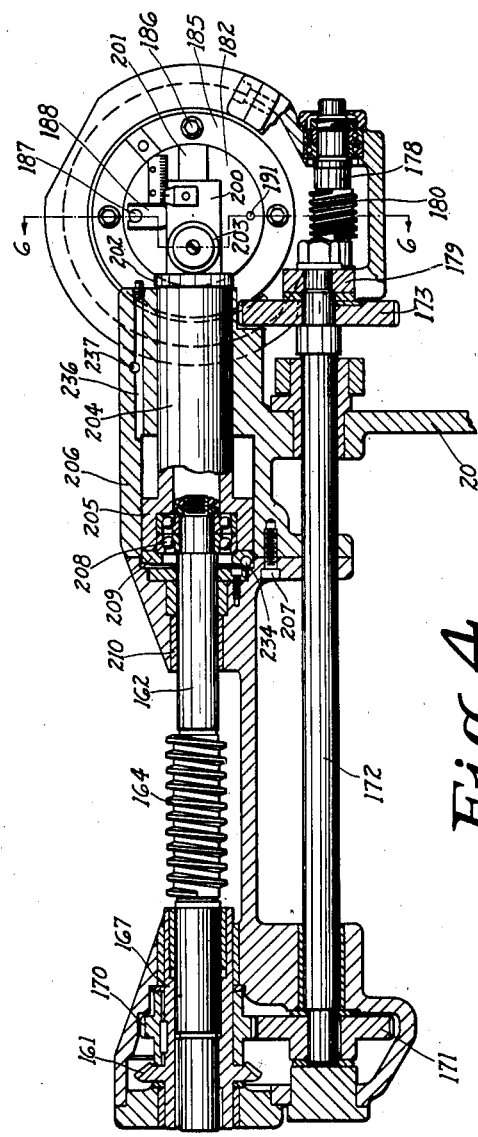
Fig. 4 is a fragmentary sectional view showing details of the drive to the cradle and of the mechanism for modifying the cradle roll.
Figure 5:
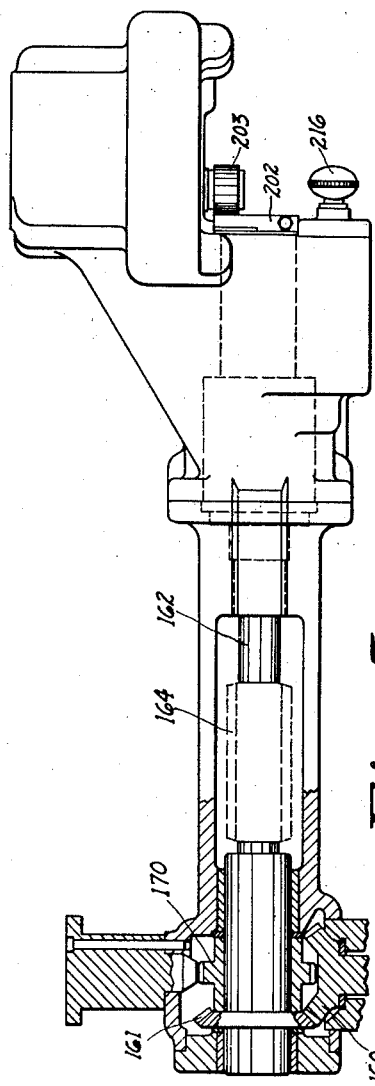
Fig. 5 is a part plan, part sectional view of the parts shown in Fig. 4.

20 denotes the base or frame of the machine. Journaled in the base is the cradle 21 (Figs. 1, 2 and 3). The cradle is mounted in semi-circular bearings formed in the base and is held in position by the semi-circular cap 22 which is secured to the base by screws 23. The cradle is a full circular cradle and revolves on roller bearings 24 that are mounted in a full circular raceway formed in the base and cap. Mounted in the cradle for rotatable adjustment therein about an axis X eccentric of the axis Y of the cradle is a cutter carrier 25. This cutter carrier is journaled in the cradle on spaced plain bearings 27 and 28. Journaled in the cutter carrier 25 for rotation about an axis Z, which is eccentric of the axis X of the cutter carrier, is the cutter spindle 30. The spindle is mounted in the carrier on spaced anti-friction bearings 31 and 32. The face mill gear cutter C, which is used for cutting gears on the machine, is secured to the spindle in any usual or suitable manner.

Figure 13:
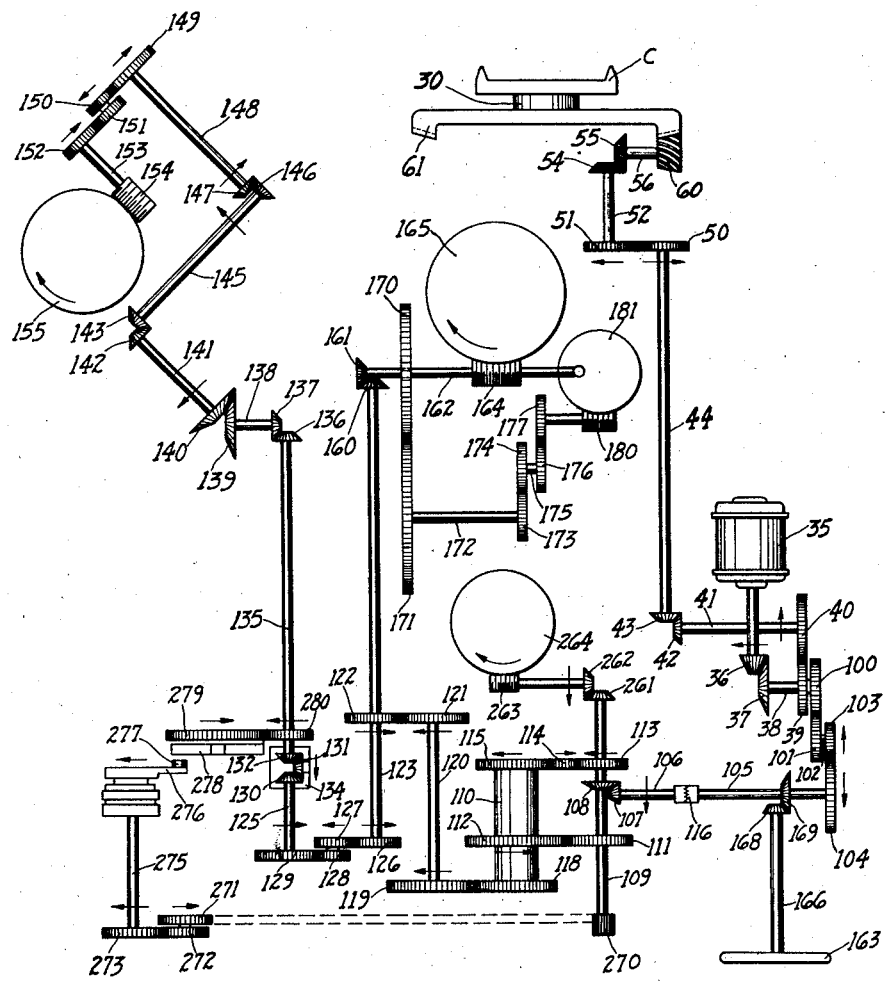
Fig. 13 is a drive diagram of the machine.

During operation of the machine, the cutter is rotated continuously on its axis. The drive to the cutter is from a motor 35 (Figs. 1 and 13). The armature shaft of the motor carries a bevel pinion 36 which meshes with the bevel gear 37 that is secured to a vertical shaft 38. Secured to this shaft 38 is a spur gear 39 which meshes with the spur gear 40 that is fastened to a parallel shaft 41. Secured to the shaft 41 is a bevel gear 42 (Figs. 3 and 13) which meshes with a bevel gear 43 that is keyed to a horizontal shaft 44.

The shaft 44 is journaled on spaced anti-friction bearings in bearing brackets 46 and 47 that are secured to the base of the machine and to the cradle, respectively. The axis of the shaft 44 coincides with the axis Y of the cradle.

At its inner end, the shaft 44 carries a spur gear 50 (Figs. 2, 3 and 13) which meshes with a spur gear 51 that is keyed to a shaft 52 which is journaled on spaced anti-friction bearings in the carrier 25 with its axis coinciding with the axis X of the carrier. Integral with the shaft 52 is a spiral bevel pinion 54. This pinion meshes with a spiral bevel gear 55 which is keyed to a stub-shaft 56 that extends at right angles to the shaft 52 and is journaled on anti-friction bearings in a sleeve 57 that is secured in any suitable manner to the tool carrier 25. There is a spiral bevel pinion 60 integral with the shaft 56 and this spiral bevel pinion meshes with spiral bevel gear 61 which is secured by screws 62 to a fly wheel member 63. The fly wheel member 63 is secured by screws 64 to the enlarged head or flange 65 of the cutter spindle 30.

The tool carrier 25 is rotatably adjustable manually in the cradle 21 and in its adjustment the bevel gear 55 revolves on the bevel pinion 54 traveling about the axis X of the tool carrier. The cradle 21 is manually adjustable on the base 20 of the machine and in its adjustment the gear 51 revolves on the gear 50 traveling about the axis Y of the cradle. The adjustment of the tool carrier on its axis serves to vary the radial distance between the axis Z and the axis Y of the cradle and the rotational adjustment of the cradle in the base serves to change the angular position of the cutter about the axis of the cradle. The two adjustments together serve to position the cutter to cut a gear of any desired spiral angle.

In the present machine, these two adjustments are made without the use of any telescoping shafts due to the mounting of the drive shafts 45 and 52 coaxially of the cradle and tool carrier, respectively. In the present machine, moreover, the final drive to the cutter is through spiral bevel gears which insure a quiet, smooth drive, capable of carrying a maximum load.

The circular gib 70, which serves to retain the tool carrier against axial movement in the cradle, is graduated to permit accurate adjustment of the tool carrier. The circular gib 71, which serves to retain the cradle against axial movement in the base of the machine, is also graduated to permit accurate adjustment of the cradle.

The gear blank G, which is to be cut, is secured to the work spindle 75 of the machine (Fig. 1). The work spindle is journaled in the work head 76. This head is mounted for vertical adjustment on a column 77 to permit offsetting the axis of the work spindle with reference to the axis of the cradle as required for the cutting of hypoid pinions. The adjustment of the work head on the column 77 is effected in known manner by rotation of a screw shaft 78 which is journaled in the column and which threads into a nut (not shown) that is secured to the work head. The work head slides in this adjustment on ways 79 and 80 formed on the column and is retained on the column by the gibs 81 and 82.

The column 77 is mounted on a plate 85 for rectilinear adjustment thereon in the direction of the axis of the work spindle. Adjustment is effected manually, and, after adjustment, the column is secured to the plate by T-bolts 86 which engage in elongated slots 87 and 88 formed in the plate. This adjustment serves to position the work in accordance with the cone-distance of the gear to be cut.

The plate 85 is adjustable angularly on the sliding base 90 about an axis $p$ which extends at right angles to the axis Y of the cradle and intersects the same. This adjustment may be made manually in any suitable manner and is for the purpose of positioning the work in accordance with the pitch cone angle of the gear to be cut. After adjustment, the plate 85 is secured to the sliding base 90 by T-bolts (not shown) which engage in arcuate T-slots 91 and 92 which are formed in the upper face of the sliding base 90 concentric of the axis $p$.

The sliding base 90 is movable in the direction of the axis Y of the cradle. It reciprocates on ways 95 and 96 formed on the upper face of the base of the machine.

To generate the tooth profiles of the gear being cut, the work spindle and cradle are rotated in timed relation as the cutter revolves in engagement with the gear blank. The generating drive to the work spindle and cradle may take any suitable form. I have illustrated the drive only diagrammatically in Fig. 13 of the accompanying drawings. It may, for instance, be the same as that employed in the machine of my co-pending application Serial No. 300,025 filed October 18, 1939.

As illustrated, the work spindle is driven from the motor 35 through a train of gearing comprising the bevel gears 36 and 37, the shaft 38, the spur gears 100 and 101, the shaft 102, the spur gears 103 and 104, the shaft 105, the shaft 106 which is connected by the clutch 116 to the shaft 105, and the bevel gears 107 and 108 which drive the shaft 109. The shaft 109 drives the shaft 110 either through the spur gears 111 and 112 or the spur gears 113, 114 and 115. When the drive is through the spur gears 111 and 112, the shaft 110 is driven in one direction. When the drive is through the spur gears 113, 114 and 115, the shaft 110 is driven in the opposite direction. The direction of drive is determined by the reversing mechanism of the machine which may be of standard construction and such, for instance, as illustrated in my prior Patent No. 2,000,215 of May 7, 1935.

The shaft 110 carries a spur gear 118 which drives a spur gear 119 that is secured to a shaft 120. The shaft 120 carries a spur gear 121 which meshes with a spur gear 122 that is secured to a shaft 123. The shaft 123 drives a shaft 125 through the set of ratio change gears 126, 127, 128, and 129. The shaft 125 carries a bevel gear 130 which forms one member of the differential of which the other two members are designated at 131 and 132. The intermediate member 131 is mounted in the differential housing 134. The member 132 is secured to a shaft 135 (Figs. 1 and 13) which carries a bevel gear 136 that meshes with the bevel gear 137 which is secured to the lower end of a shaft 138 that is journaled in the base of the machine coaxial of the axis p of adjustment of the plate 85. At its upper end the shaft 138 carries a bevel gear 139 which meshes with the bevel gear 140 that is secured to a diagonal shaft 141. The diagonal shaft 141 carries a bevel gear 142 which meshes with a bevel gear 143 that is secured to a horizontal telescoping shaft 145. The shaft 145 carries at its rear end a bevel gear 146 which meshes with a bevel gear 147 that is secured to the lower end of a vertical telescoping shaft 148. At its upper end the shaft 148 carries a spur gear 149 forming one of a set of index change gears of which the other members are denoted at 150, 151, and 152. The gear 152 is secured to a shaft 153 which carries a worm 154 that drives the worm wheel 155. The worm wheel 155 is secured to the work spindle 75 of the machine.

The drive to the cradle is from the shaft 123 through the bevel gears 160 and 161. The bevel gear 161 is slidably keyed to a shaft 162 (Figs. 2, 4, 5 and 13) with which there is integral the worm 164. This worm meshes with the worm wheel 165 (Figs. 2, 3 and 13) which is fastened in any suitable manner to the cradle 21.

Figure 9:
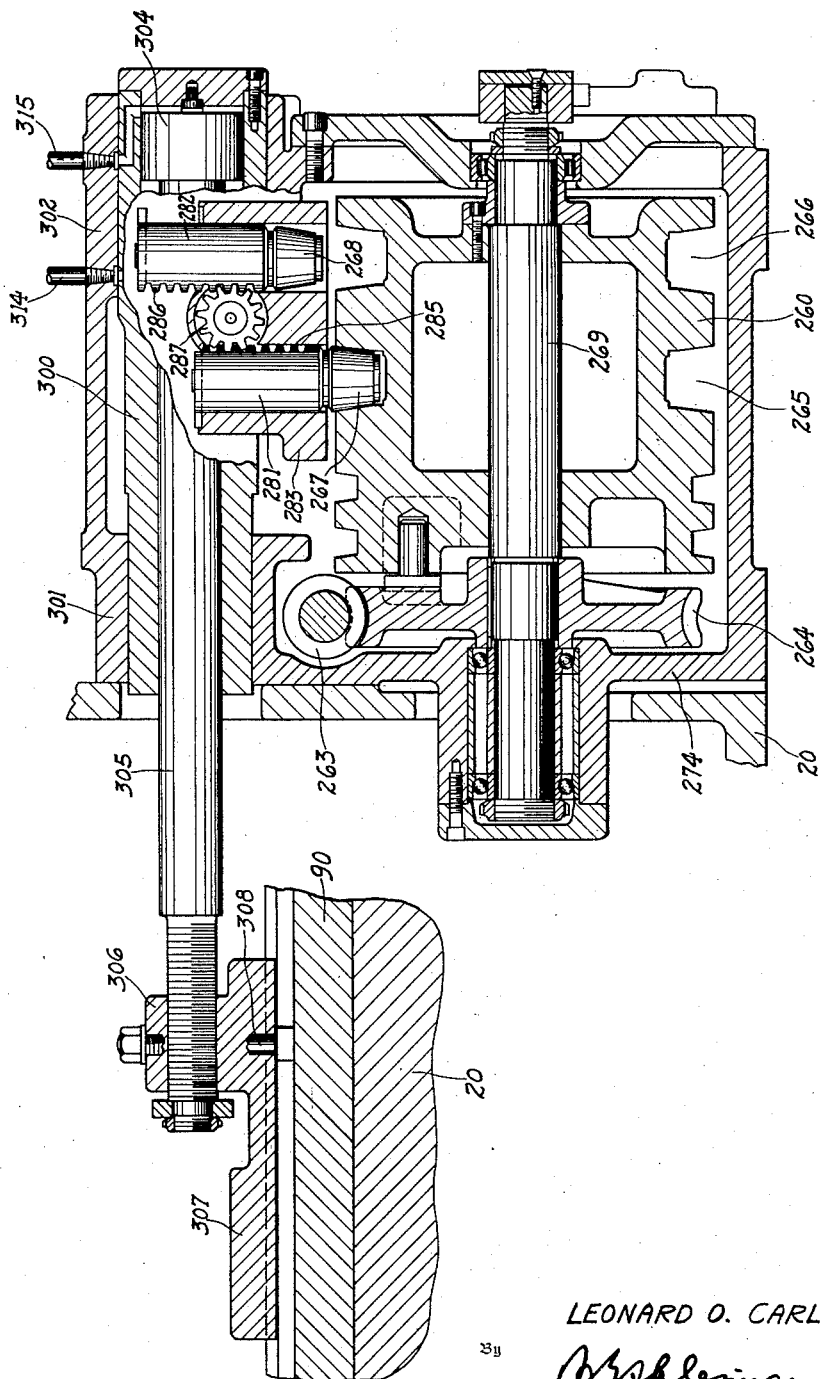
Fig. 9 is a fragmentary sectional view showing the feed cam and the mechanism connecting the cam with the sliding base including the piston and block.
Figure 10:
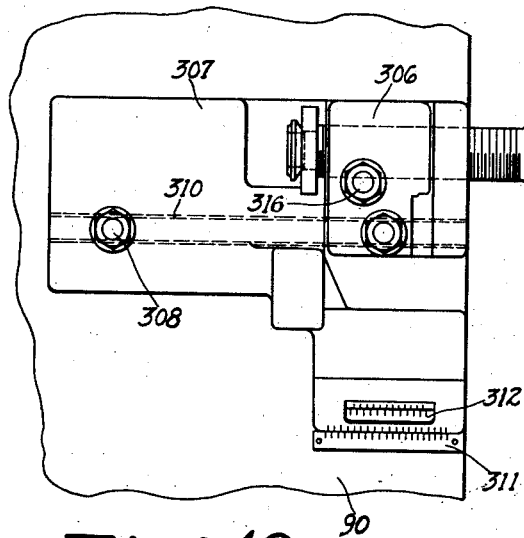
Fig. 10 is a fragmentary plan view of the block and the sliding base and further illustrating the connection.
Figure 11:
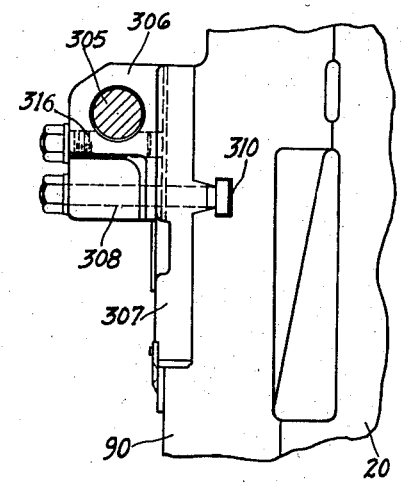
Fig. 11 is a fragmentary elevational view of the parts shown in Fig. 10.

The clutch 116 is provided to allow the tool drive to be disconnected from the cradle and other drives of the machine for adjustment. When the clutch is disconnected, the gear train that drives the cutter may be adjusted by rotating the handwheel 163 (Figs. 1 and 9). This handwheel is secured to a shaft 166 which carries a bevel gear 168 that meshes with a bevel gear 169 which is secured to the shaft 105.

As has already been described, means is provided in the present machine for modifying the rolling movement of the cradle during generation of the tooth profiles. This modifying mechanism operates to vary the ratio of the cradle movement to the rotation of the work spindle during generation and serves to permit control of the pressure angle, tooth bearing and profile of the gear being cut. The mechanism for modifying the motion of the cradle will now be described.

Figure 6:
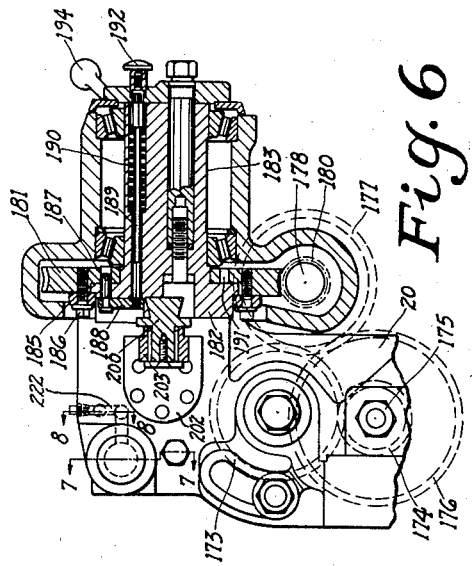
Fig. 6 is a section on the line 6—6 of Fig. 4 looking in the direction of the arrows.

Keyed to the sleeve 167, which is integral with the bevel gear 161 (Figs. 4, 5 and 13), is a spur gear 170. This spur gear meshes with a spur gear 171 that is keyed to a shaft 172 which is suitably journaled in the base or frame of the machine. The shaft 172 carries a spur gear 173 which is normally connected to the shaft by a clutch member 179. This spur gear 173 meshes with a spur gear 174 (Figs. 4, 6 and 13) that is secured to a stub-shaft 175 that is suitably journaled in the base of the machine. The stub-shaft carries a second spur gear 176 that meshes with a spur gear 177 which is secured to a shaft 178 that is also suitably journaled in the frame of the machine.

Integral with the shaft 178 is a worm 180. This worm meshes with the worm wheel 181. The worm wheel is mounted on the enlarged head 182 of a shaft 183 which is rotatably adjustable relative thereto about the common axis of shaft and wormwheel. The wormwheel is held against axial movement relative to the shaft by a circular gib 185 which is secured to the head of the shaft by screws 186. The wormwheel is locked against rotational movement relative to the shaft by a pin 187 which is adapted to be engaged selectively in one of two spaced holes 191 that are formed in the wormwheel. The pin 187 is carried by a plate 188 which is secured to the end of a rod 189. The rod 189 is slidable in an opening or bore formed in the shaft 183. A coil spring 190 which seats in this bore and operates against a shoulder formed on the rod 189 serves to hold the pin 187 in locking position. A knob 192 is provided on the rear end of the rod 189 to permit the rod to be pushed forward manually to release the pin. A hand wheel 194, which is secured to the rear end of the shaft 183 by screws (not shown), is provided to enable the shaft to be rotated relative to the worm wheel when the pin 187 is released. The purpose of this adjustment will appear hereinafter.

Mounted on the head 182 of the shaft 183 is a block 200. This block has a dove-tailed portion which engages in a correspondingly shaped diametral slot 201 formed in the head 182 of the shaft so that the block may be adjusted radially of the axis of the shaft. Mounted on the block is a roller 203. This roller engages a hardened plate 202 that is secured to one end of a piston rod 204 (Figs. 4 and 5) which is integral with a piston 205.

The piston is reciprocable in a cylinder 206 which is secured by screws 207 to the base of the machine. The piston is connected by the roller thrust bearings 208 and a gib 209 to the worm shaft 162. The worm shaft is slidably mounted in the sleeve 167 of the bevel gear 161 and in a bearing 210 so that any movement of the piston is transmitted to the worm shaft 162 to cause the worm 164 to be moved axially. Axial movement of the worm 164, of course, imparts a rotary movement to the cradle which is in addition to the rotary movement of the cradle produced by the rotation of the worm shaft 162. This motion is an algebraic motion, adding to or subtracting from the motion of the cradle produced by the rotation of the worm shaft 162, depending upon the direction of axial movement of the worm shaft. It will be seen, then, that as the cradle worm shaft 162 is rotated in one direction or the other under actuation of the bevel gears 160 and 161, the worm shaft 178 will also be rotated correspondingly in one direction or the other through the spur gears 170, 171, 173, 174, 176, and 177, and thus the worm wheel 181 will be rotated to impart reciprocatory motion to the cradle worm shaft 162 through the roller 203 and the piston rod 205.

By adjusting the block 200 on the head 182 of the shaft 183, and by suitably selecting the change gears 173, 174, 176 and 177, the amount of axial movement of the worm shaft 162 can be controlled. By adjusting the shaft 183 in the wormwheel 181, the roller 203 can be positioned selectively in one of two diametrically opposite positions so that the direction of axial movement of the worm can be determined. Ordinarily the worm moves in one direction during generation of one side of the teeth of the blank and in the opposite direction during generation of the opposite sides of the teeth. By opening the clutch 179 and rotating the worm shaft 178, the position of the roller 203 can further be adjusted relative to the piston rod to vary the phase of modification of the roll.

With the mechanism described, then, the ratio of the movement of the cradle relative to the rotation of the work spindle can be varied to suit the job which is to be cut upon the machine. The machine may be employed, then, to cut pinions conjugate to non-generated gears as well as pinions conjugate to a crown gear, the form of the tooth profile and the character of the tooth bearing can be controlled, and, the capacity of the machine itself can be increased beyond the ordinary limits.

The piston rod 204 is held against the roller 203 by fluid pressure on the left hand end of the piston 205. When adjustment of the pin 203 and head 182 is to be made, the left hand end of the piston is put on exhaust and the right hand on supply. Thus, the fluid pressure is relieved and the piston is moved free of the roller.

Figures 7, 8:
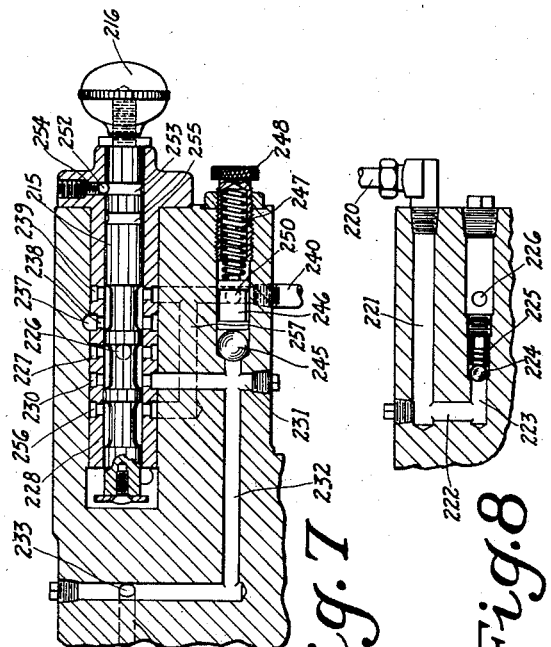
Fig. 7 is a section on the line 7—7 of Fig. 6 looking in the direction of the arrows, but on an enlarged scale.
Fig. 8 is a section on the line 8—8 of Fig. 6 looking in the direction of the arrows, also on an enlarged scale.

The direction of flow of the pressure fluid to the cylinder 206 is controlled by a manually operable valve 215 which is reciprocable in a sleeve 228 and which may be manipulated by the knob 216 (Fig. 7). Pressure fluid is supplied to this valve through a duct 220 (Fig. 8) that is connected with a suitable pump (not shown) which is mounted in the base of the machine. The pressure fluid flows from duct 220 through ducts 221, 222 and 223 to a ball check valve 224. Thence it flows through ports 227 of sleeve 228 into the valve chamber. A spring 225 tends to hold the ball check valve 224 shut and insures that the pressure in the line 226 will be at the minimum for the required functioning of the machine.

In the position of the valves shown in Fig. 7, the pressure fluid flows from the ports 227 through the ports 230 of the sleeve 228, the ducts 231, 232, 233 and 234 (Figs. 7 and 4) to the left hand end of the piston 205. At the same time, the pressure fluid is exhausted from the right hand end of the piston through the ducts 236 and 237, ports 238 and 239 of sleeve 228, and the duct 240 to the sump of the machine.

With the valve 215 in the position shown in Fig. 7, then, the piston rod 204 is held under fluid pressure against the roller 203. As the shaft 183 rotates then, carrying the roller 203 away from the position shown in Fig. 4, the pressure fluid will cause the piston rod to follow the roller, thus moving the worm shaft 162 axially to the right. When the direction of rotation of the shaft 183 is reversed by the reversing mechanism of the machine, the piston rod is still held against the roller by the fluid pressure and the worm shaft will move to the left still under control of the roller 203. To allow of the leftward movement of the piston, a by-pass valve 245 is provided. This ball valve is held in normally closed position by a coil spring 247 which presses against a block 246 that seats against the ball. The spring is interposed between the block and a nipple 248 which threads into the bracket 206. The ball, block, and spring are mounted in a bore which aligns with the duct 232. By means of the nipple 248, the pressure exerted by the spring 247 is adjusted so that the by-pass valve cannot be opened until the pressure in the duct exceeds the pressure of the fluid flowing from the pump. Thus a load is put on the piston rod 204 holding it against the roller 203 in the leftward movement of the piston rod. The pressure fluid forced out of the left hand end of the cylinder 206 in this leftward movement of the piston 204 exhausts from the duct 232 through the by-pass valve 245 into a duct 250 which communicates with the exhaust duct 240.

The valve 215 is locked in the position shown in Fig. 7 during the cutting operation of the machine, being held in this position by a ball-detent 252 which is adapted to engage in a recess 253 turned in the stem of the valve. This detent is resiliently held in locking position by the coil spring 254. To relieve the pressure on the piston slide 204 in order to permit adjustment of the roller 203, the operator of the machine pulls the valve 215 to the right from the position shown in Fig. 7 far enough for the ball-detent 252 to enter the groove 255 of the valve stem. This will cause the duct 237 leading to the right hand end of the piston 204 to be put on supply and the duct 234 leading from the left end of the piston to be put on exhaust. This causes the piston 204 to be moved to the left away from the roller 203 until the piston bottoms in the cylinder 206. It will be held in this position then by fluid pressure, and, when the shaft 183 is rotated, will not follow the roller. The exhaust from the left hand end of the cylinder is through the ducts 234, 232, 231, and the ports 230 and 256 of the sleeve 228, and the duct 257 to the exhaust duct 240.

Figure 12:
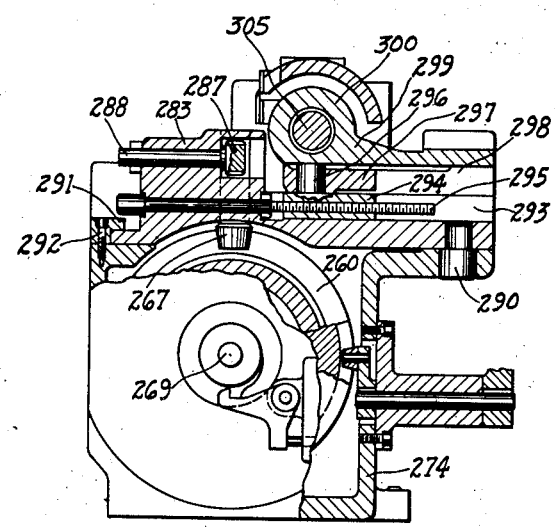
Fig. 12 is a fragmentary view on a somewhat smaller scale and partly in section, showing more particularly the connection of the feed cam with the piston.

When the cradle and the work spindle have completed their generating roll in one direction, the reverse mechanism of the machine is tripped to reverse the direction of the drive. The work is then withdrawn from engagement with the cutter for indexing. The withdrawal movement is effected by a suitable feed cam 260 (Figs. 9 and 12) that is operatively connected with the sliding base 90. The feed cam may be driven in a manner similar to that described in my copending application No. 300,025 above mentioned, from the shaft 109 (Fig. 13) through the bevel gears 261, 262, the worm 263 and the worm wheel 264. The worm wheel is keyed to a shaft 269 that is suitably journaled in a bracket 274 that is suitably mounted in the base of the machine. The cam is keyed or otherwise suitably secured to the shaft to rotate with the worm wheel and the shaft.

The cam 260 is provided with two tracks 265 and 266, one of which controls the movement of the sliding base 90 during the rough-cutting of the teeth of a gear blank and the other of which is employed to control the movement of the sliding base during finish-cutting. Two rollers 267 and 268, respectively, are provided to selectively engage the cam tracks 265 and 266. These rollers are carried upon the lower ends of posts 281 and 282, respectively, which are mounted for axial reciprocation in the cam lever 283. Racks 285 and 286, respectively, are cut in the opposed faces of the posts 281 and 282. A spur pinion 287 is interposed between and meshes with the two racks. This spur pinion is integral with a shaft 288 which is journaled in the cam lever 283 and is manually rotatable to move one or the other roller 267 or 268 selectively into engagement with the tracks 265 and 266 of the cam. When one roller is moved into operative position, the other is retracted therefrom.

The lever 283 is pivotally mounted by means of the stud or pin 290 in bracket 274. A gib 291 and screws 292 serve to retain the lever 283 in place.

Slidably mounted in an elongated slot 293 formed in the lever 283 is a block 294. This block is adjusted by means of a screw shaft 295 which is journaled in the lever and which threads into the block. There is a pin 296 integral with the block 294 and on this pin there is pivotally mounted a second block 297 which engages in an elongated slot 298 formed in an extension 299 of a cylinder 300.

The cylinder is slidably mounted in aligned bearings or guides 301 and 302 formed in the bracket 274. A piston 304 is mounted to reciprocate in the cylinder 300. Integral with this piston is a piston rod 305. The piston rod is threaded at its projecting end into a nut 306. This nut is integral with a block 307 which, during operation of the machine, is fastened to the sliding base by T-bolts 308 whose heads engage in an elongated T-slot 310 formed in the upper face of the sliding base.

Fluid under pressure may be admitted to opposite sides of the piston 304 through ducts 314 and 315, respectively (Fig. 9). A hand operated valve (not shown) may be provided at any suitable point on the machine, as described in my prior application above mentioned, to control the direction of flow of the pressure fluid.

The piston 304 is shown in Fig. 9 in the position which it occupies during cutting of the teeth of a gear blank. It is bottomed in the right hand end of the cylinder 300 and is held in such position by the head of pressure fluid admitted through the duct 314 and entrapped between the left hand end of the piston and the left hand end-wall of the cylinder. As the cam 260 rotates, then, the cylinder 300 will move alternately to the right and left in the bracket 274, carrying with it the piston 304 and the sliding base 90. Thus the work will be moved alternately into and withdrawn from cutting engagement with the cutter C.

During the periodic withdrawal movements of the sliding base, the work is indexed. The indexing mechanism forms no part of the present invention but may be the same as employed in the machine of my co-pending application already mentioned. With such a mechanism, the differential housing 134, which is held against rotation during cutting, is unlocked and is then rotated by a train of gearing comprising the spur gears 270, 271, 272, and 273, the shaft 275, the arm 276 carrying the roller 277, the Geneva wheel 278 with which the roller engages, and the spur gears 279 and 280. Thus an algebraic movement is imparted to the train of gearing which drives the work spindle to index the work spindle.

When the indexing of the work has been completed, the feed cam operates to return the work again into operative engagement with the cutter to cut a new tooth space in the blank and the cycle of operation of the machine begins anew.

At the end of the cutting operations upon a gear blank, when all of the teeth have been cut, the sliding base 90 may be moved to loading position, to permit removal of the completed gear and chucking of a new gear blank, by putting the duct 315 on supply and the duct 314 on exhaust (Fig. 9). Then the piston 304 moves to the left in the cylinder 300 carrying the sliding base 90 outwardly beyond its normal working path to loading position. When the completed gear has been removed and a new blank chucked, the sliding base can be returned to operative position again by putting the duct 314 on supply and the duct 315 on exhaust.

The block 307 is slidably adjustable on the sliding base 90 in the direction of the movement of the sliding base, that is, in the direction of the axis of the cradle 21. The adjustment of the block with reference to the sliding base is made when modifying the settings of the machine in th development of a gear. A scale 311 and vernier 312 are provided to enable the adjustment to be made precisely. This adjustment determines the extent of inward movement of the sliding base 90. As already indicated, the block 307 is secured to the sliding base, after adjustment, by the T-bolts 308 which engage in the elongated T-slot 310.

A change in height of the cutter blades, as after sharpening, is compensated for by adjusting the piston rod 305 longitudinally in the block 307. A pin 316, that is threaded into the block 307 and that is shaped to engage the threads of the piston rod, serves normally to hold the piston rod against movement with reference to the block 307. To effect adjustment of the piston rod, the pin 316 is loosened and the piston rod is rotated by a wrench or any other suitable tool to thread it longitudinally in the nut 306. Any suitable gauge may be employed to permit this adjustment to be made precisely. This adjustment makes it possible to eliminate the adjustment of the cutter spindle heretofore provided in face-mill gear cutting machines and allows of much more rigid mounting of the cutter than has heretofore been possible.

While the invention has been described in connection with a machine for cutting spiral bevel and hypoid gears, it will be understood that certain features of the invention are usable on machines for cutting other types of gears also and while the invention has been described in connection with a particular embodiment thereof, it will be understood that it is capable of further modification. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for producing gears, a frame, a work support mounted on the frame, a full circular cradle journaled in the frame for rotatable adjustment and movement and having a full circular bearing, a tool carrier journaled eccentrically in the bearing of said cradle for rotatable adjustment therein about an axis parallel to the axis of the cradle, a cutter spindle journaled eccentrically in the tool carrier for rotation on an axis parallel to the axis of the tool carrier, a face mill gear cutter secured to the cutter spindle, means for rotating the cradle, and means for rotating the cutter spindle comprising a shaft which is journaled in the frame coaxially of the cradle, a second shaft journaled in the tool carrier coaxially of the tool carrier, means for driving the second shaft from the first, a third shaft journaled in the tool carrier and disposed at an angle to the second shaft, a pair of bevel gears for driving the third shaft from the second, and means comprising a pair of bevel gears for driving the cutter spindle from the third shaft.

2. In a machine for producing gears, a frame, a full circular cradle journaled in the frame for rotatable adjustment and movement thereon and having a full circular bearing, a tool carrier journaled eccentrically in the bearing of said cradle for rotatable adjustment thereon about an axis parallel to the axis of the cradle, a cutter spindle journaled directly in the tool carrier for rotation on an axis parallel to but eccentric of the axis of the tool carrier, a face mill gear cutter secured to the cutter spindle and having a plurality of circularly arranged cutting blades which project beyond one side face of the cutter in the general direction of the axis of the cutter, a sliding base, a work support mounted on the sliding base, said sliding base being mounted on the frame for adjustment in the direction of the axis of the cradle to permit the work to be adjusted to compensate for change in height of the blades of the cutter after sharpening, means for rotating the cradle, and means for rotating the cutter spindle comprising a shaft which is journaled in the frame coaxially of the cradle, a second shaft journaled in the tool carrier coaxially of the tool carrier, a pair of spur gears for driving the second shaft from the first, a third shaft disposed at an angle to the second shaft and journaled in the tool carrier, a pair of bevel gears, one of which is secured to the second shaft and the other of which is secured to the third shaft for driving the third shaft from the second, and a pair of bevel gears, one of which is secured to the third shaft and the other of which is connected to the cutter spindle for driving the cutter spindle from the third shaft.

3. In a machine for producing gears, a frame, a cradle oscillatably mounted in the frame, a sliding base mounted on the frame, a work support mounted on the sliding base, a cutter carrier adjustably mounted on the cradle, a cutter spindle journaled directly in said carrier with its axis parallel to but eccentric of the axis of the cradle, and a rotary face mill gear cutter secured to the cutter spindle, said cutter being provided with a plurality of circularly arranged cutting blades which project beyond one side face of the cutter in the general direction of the axis of the cutter, and said sliding base being adjustable on the frame in the direction of the axis of the cradle to permit the work to be adjusted to compensate for change in height of the blades of the cutter after sharpening.

4. In a machine for producing gears, a face-mill gear cutter, a frame, a sliding base mounted on the frame for sliding movement in the direction of the cutter axis, a work support mounted on the sliding base, a block secured to the sliding base and adjustable relative thereto in the direction of the cutter axis, means adjustably connected to said block for effecting movement of the sliding base in the direction of the cutter axis, said last named means being adjustable relative to the block in the direction of the cutter axis, and means for rotating the cutter.

5. In a machine for producing gears, a frame, a cradle oscillatably mounted on the frame, a face-mill cutter journaled in the cradle with its axis parallel to the axis of the cradle, a sliding base mounted on the frame for movement in the direction of the axis of the cradle, a work support mounted on the sliding base, a work spindle journaled in the work support, a block secured to the sliding base for adjustment relative thereto in the direction of the cradle axis, a cam, a cylinder operatively connected with the cam for reciprocation in the direction of the cradle axis on rotation of the cam, a piston reciprocably mounted in the cylinder for movement in the direction of the cradle axis, a piston rod secured to said piston and having a threaded connection with said block, means for rotating the cam to impart movement to the sliding base, means for admitting fluid under pressure to opposite sides of the piston to move the sliding base independently of said cam, means for rotating the cutter, and means for rotating the work spindle and cradle in timed relation to generate the tooth profiles.

6. In a machine for producing gears, a work support, a tool support, an oscillatory cradle on which one of said supports is mounted, a work spindle journaled in the work support, a cutter spindle journaled in the tool support, a face mill gear cutter secured to the cutter spindle, means for rotating the cutter spindle, means for rotating the work spindle at a uniform velocity, and means for rotating the cradle comprising a worm wheel which is secured to the cradle, a worm meshing therewith, means for rotating the worm at a uniform velocity in time with the work spindle rotation, and means for simultaneously moving the worm axially at a varying velocity.

7. In a machine for producing gears, a work support, a tool support, an oscillatory cradle on which one of said supports is mounted, a work spindle journaled in the work support, a cutter spindle journaled in the tool support, a face mill gear cutter secured to the cutter spindle, means for rotating the cutter spindle, means for rotating the work spindle at a uniform velocity, and means for rotating the cradle comprising a worm wheel which is secured to the cradle, a worm meshing therewith, means for rotating the worm at a uniform velocity in time with the work spindle rotation, an oscillatable control member, a roller mounted on said control member for radial and angular adjustment thereon, means operatively connecting the roller to the worm to reciprocate the worm on rotation of said control member, and means for oscillating the control member in time with the rotation of the worm.

8. In a machine for producing gears, a work support, an oscillatory cradle, a face-mill cutter journaled in the cradle with its axis parallel to the axis of the cradle, means for rotating the cutter, means for rotating the work spindle, and means for oscillating the cradle comprising a worm wheel which is secured to the cradle, a worm meshing therewith, means for rotating the worm in time with the work spindle rotation, an oscillatable control member, a roller mounted on said control member for adjustment radially of the axis of said control member and angularly about the axis of said control member, means operatively connecting the roller to the worm to reciprocate the worm on rotation of the control member, means for driving said control member on rotation of said worm, and means adjustably connecting the control member to said drive means to permit adjustment of the control member on its axis independently of said drive means.

9. In a machine for producing gears, a work support, a tool support, an oscillatory cradle on which one of said supports is mounted, a work spindle journaled in the work support, a cutter spindle journaled in the tool support, a face mill gear cutter secured to the cutter spindle, means for rotating the cutter spindle, means for rotating the work spindle, means for rotating the cradle comprising a worm wheel secured to the cradle, a worm meshing therewith, a shaft to which the worm is secured, means for rotating the worm shaft at a uniform velocity, and means driven from the worm shaft for reciprocating the worm shaft axially at a non-uniform velocity in time with its rotary movement, and means for periodically indexing the work spindle.

10. In a machine for producing gears, a worm wheel, a worm meshing therewith, a shaft to which the worm is secured, a rotary member having a roller mounted eccentrically thereon, fluid pressure operated means for holding one end of the worm shaft against said roller, means for rotating the worm shaft, and means for simultaneously rotating the rotary member to impart a reciprocating movement at a varying velocity to the worm shaft.

11. In a machine for producing gears, a rotary gear, a reciprocatory gear meshing therewith, means for reciprocating said gear comprising a rotary shaft, a roller mounted on the shaft for adjustment to offset it different distances from the axis of the shaft, means for rotating the shaft, and means for operatively connecting the reciprocable gear to the roller to reciprocate on rotation of the shaft comprising a piston secured to the reciprocable gear, a cylinder in which the piston reciprocates, means for admitting fluid under pressure to opposite ends of the cylinder, means for connecting one end of the cylinder to exhaust including a normally closed valve which may be opened only when the pressure upon it exceeds a predetermined minimum, and a valve for controlling the connection of the two ends of the cylinder selectively with supply and exhaust.

12. In a machine for producing gears, a work support, a tool support, a cradle on which one of the supports is mounted, a work spindle journaled in the work support, tool mechanism mounted on the tool support, means for rotating the work spindle, a worm wheel secured to the cradle, a worm meshing therewith, a shaft to which the worm is secured, means for rotating the shaft in time with the work spindle rotation, and means for reciprocating said shaft axially comprising a control member having a roller adjustable radially thereon, means for rotating the control member, and means for holding the shaft against the roller to cause the shaft to be reciprocated axially on rotation of the control member.

13. In a machine for producing gears, a work support, a tool support, a cradle on which one of said supports is mounted, a work spindle journaled in the work support, tool mechanism mounted on the tool support, means for rotating the work spindle, a worm wheel secured to the cradle, a worm meshing therewith, a shaft to which the worm is secured, means for rotating said shaft in time with the work spindle rotation, and means for reciprocating said shaft axially comprising, a rotary control member, a plate mounted on the control member for adjustment angularly about the axis of the control member, a roller mounted on the plate for adjustment radially of the axis of the control member, means for rotating the control member, and means for holding the shaft against the roller to cause the shaft to be reciprocated axially on rotation of the control member.

14. In a machine for producing gears, a work support, a tool support, a cradle on which one of said supports is mounted, a work spindle journaled in the work support, tool mechanism mounted on the tool support, means for rotating the work spindle, a worm wheel secured to the cradle, a worm meshing therewith, a shaft to which the worm is secured, means for rotating the shaft in time with the work spindle rotation, and means for reciprocating said shaft axially comprising a rotary control member, a plate mounted on the control member for adjustment angularly about the axis of the control member, a roller mounted on the plate for adjustment radially of the axis of the control member, means for rotating the control member, a piston secured to one end of said shaft, a cylinder in which the piston reciprocates, means for exerting fluid pressure against one side of said piston to hold the opposite end of the piston against the roller in both directions of reciprocation of the shaft, and means for relieving said hydraulic pressure to permit of adjustment of the plate and roller on the control member.

LEONARD O. CARLSEN.